(12) United States Patent
Yu et al.

(10) Patent No.: US 10,824,228 B2
(45) Date of Patent: Nov. 3, 2020

(54) DEFORMATION CONTROL METHOD, DEFORMATION CONTROL APPARATUS, AND USER EQUIPMENT (UE)

(71) Applicant: Beijing Zhigu Rui Tuo Tech Co., Ltd., Beijing (CN)

(72) Inventors: Kuifei Yu, Beijing (CN); Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 273 days.

(21) Appl. No.: 15/367,497

(22) Filed: Dec. 2, 2016

(65) Prior Publication Data

US 2017/0168563 A1 Jun. 15, 2017

(30) Foreign Application Priority Data

Dec. 11, 2015 (CN) .......................... 2015 1 0920776

(51) Int. Cl.
*G06F 3/01* (2006.01)
*G09G 3/00* (2006.01)
*G09G 3/36* (2006.01)

(52) U.S. Cl.
CPC .............. *G06F 3/013* (2013.01); *G09G 3/00* (2013.01); *G09G 3/36* (2013.01); *G09G 2340/04* (2013.01);
(Continued)

(58) Field of Classification Search
CPC .................................. G06F 3/013; G09G 5/14
See application file for complete search history.

(56) References Cited

U.S. PATENT DOCUMENTS

| 2012/0038570 A1 | 2/2012 | Delaporte |
| 2012/0242901 A1 | 9/2012 | Engelblik |

(Continued)

FOREIGN PATENT DOCUMENTS

| CN | 103309592 A | 9/2013 |
| CN | 103873670 A | 6/2014 |

(Continued)

*Primary Examiner* — Kent W Chang
*Assistant Examiner* — Scott D Au
(74) *Attorney, Agent, or Firm* — Sheppard Mullin Richter & Hampton LLP

(57) ABSTRACT

Embodiments of the present application disclose a deformation control method, a deformation control apparatus, and a user equipment (UE). The method comprises: generating trigger information according to a focus behavior of a user on at least one associated region in multiple associated regions on a deformation controllable device, where the multiple associated regions are multiple regions on which the user synchronously focuses or will synchronously focus; and controlling, in response to the trigger information, the deformation controllable device to be deformed to a target shape that meets at least one shape restriction condition, where the at least one shape restriction condition comprises: a distance between any two associated regions in the multiple associated regions is less than a distance threshold. The technical solutions of the embodiments of the present application make it more convenient for a user to focus on multiple associated regions on which the user synchronously focuses, and facilitate use of the deformation controllable device by the user.

23 Claims, 6 Drawing Sheets

(52) U.S. Cl.
CPC . *G09G 2340/0407* (2013.01); *G09G 2340/14* (2013.01); *G09G 2354/00* (2013.01)

(56) References Cited

U.S. PATENT DOCUMENTS

| | | |
|---|---|---|
| 2013/0300732 A1 | 11/2013 | Hosoya |
| 2014/0306908 A1* | 10/2014 | Nagaraju ............. G06F 3/0416 345/173 |
| 2015/0153777 A1 | 6/2015 | Liu et al. |
| 2015/0177906 A1* | 6/2015 | Yairi .................... G06T 3/0006 345/648 |
| 2015/0219902 A1* | 8/2015 | Kim .................. G02B 27/0179 345/8 |
| 2015/0293620 A1 | 10/2015 | Cho |
| 2016/0259514 A1* | 9/2016 | Sang .................. G06F 3/04817 |

FOREIGN PATENT DOCUMENTS

| | | |
|---|---|---|
| CN | 104317396 A | 1/2015 |
| CN | 106062678 A | 10/2016 |

\* cited by examiner

DEFORMATION CONTROL METHOD, DEFORMATION CONTROL APPARATUS, AND USER EQUIPMENT (UE)

CROSS REFERENCE TO RELATED APPLICATION

The present application is based on and claims the benefit of priority to Chinese Application No. 201510920776.X, filed on Dec. 11, 2015, the entire contents of which are incorporated herein by reference.

TECHNICAL FIELD

The present application relates to the field of information processing technologies, and in particular, to a deformation control method, a deformation control apparatus, and a user equipment (UE).

BACKGROUND

With demands for large screen display of users, there is a trend towards increasing sizes of computer screens, mobile phones, and the like. However, a large-size UE brings inconvenience of operations to a user while providing the user with better enjoyment on aspects such as a visual aspect. For example, gaze and/or an operation on two objects between which a distance is relatively large needs to cross larger space, and with an improvement in a tensile property of a flexible display device, the problem becomes even more severe.

SUMMARY

A possible objective of embodiments of the present application is: to provide a deformation controllable device-based deformation control solution.

According to a first aspect, a possible technical solution of the present application provides a deformation control method, comprising:

generating trigger information according to a focus behavior of a user on at least one associated region in multiple associated regions on a deformation controllable device, where the multiple associated regions are multiple regions on which the user synchronously focuses or will synchronously focus; and controlling, in response to the trigger information, the deformation controllable device to be deformed to a target shape that meets at least one shape restriction condition, where the at least one shape restriction condition comprises: a distance between any two associated regions in the multiple associated regions is less than a distance threshold.

According to a second aspect, a possible technical solution of the present application provides a deformation control apparatus, comprising:

a trigger information generation module, configured to generate trigger information according to a focus behavior of a user on at least one associated region in multiple associated regions on a deformation controllable device, where the multiple associated regions are multiple regions on which the user synchronously focuses or will synchronously focus; and a deformation control module, configured to control, in response to the trigger information, the deformation controllable device to be deformed to a target shape that meets at least one shape restriction condition, where the at least one shape restriction condition comprises: a distance between any two associated regions in the multiple associated regions is less than a distance threshold.

According to a third aspect, a possible technical solution of the present application provides a UE, where the UE comprises:

a memory, configured to store a program; and a processor, configured to execute the program stored in the memory, where the program enables the processor to execute the following operations:

generating trigger information according to a focus behavior of a user on at least one associated region in multiple associated regions on a deformation controllable device, where the multiple associated regions are multiple regions on which the user synchronously focuses or will synchronously focus; and controlling, in response to the trigger information, the deformation controllable device to be deformed to a target shape that meets at least one shape restriction condition, where the at least one shape restriction condition comprises: a distance between any two associated regions in the multiple associated regions is less than a distance threshold.

According to at least one technical solution of the embodiments of the present application, a deformation controllable device is controlled to be deformed, making it more convenient for a user to focus on multiple associated regions on which the user synchronously focuses, and facilitating use of the deformation controllable device by the user.

DETAILED DESCRIPTION

The following describes specific implementing manners of the present application in further detail with reference to accompanying drawings (a same reference sign in several accompanying drawings represents a same element) and embodiments. The following embodiments are used to describe the present application, rather than limit the scope of the present application.

It should be understood by a person skilled in the art that terms such as "first" and "second" in the present application are merely used to differentiate different steps, devices, modules, or the like, and the terms neither represent any particular technical meaning nor represent a necessary logical order thereof.

The inventor of the present application discovers that when a user needs to synchronously focus on two associated regions that are associated with each other, if a UE is of a relatively large size, and the two associated regions are located at positions that are relatively distant from each other on the UE, eyes or a hand of the user needs to cross a relatively large distance, so as to switch between the two associated regions, which brings inconvenience to use of the UE by the user.

In the following description of the embodiments of the present application, "synchronous focus" on multiple associated regions means that: attention of a user is continuously switched among the multiple associated regions in a relatively short time interval.

Figure 1:
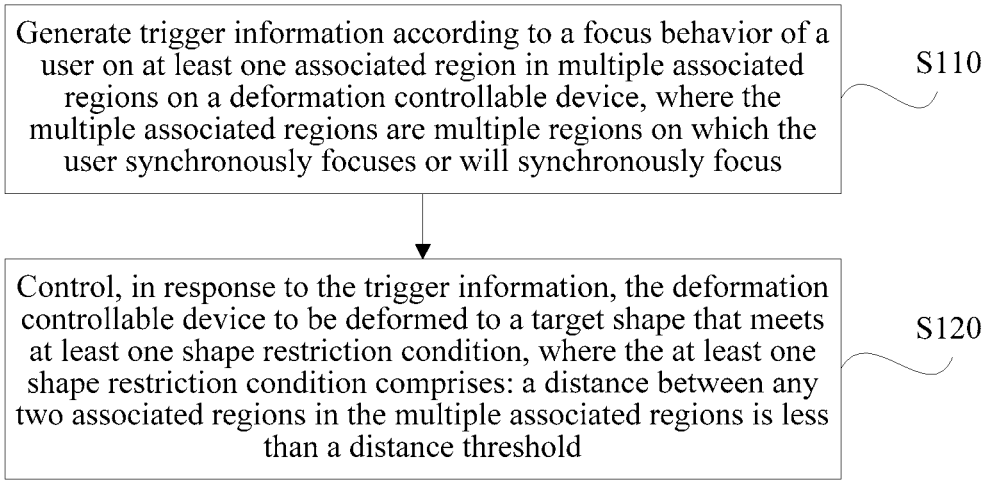
FIG. 1 is a flowchart of a deformation control method according to an embodiment of the present application.

As shown in FIG. 1, an embodiment of the present application provides a deformation control method, comprising:

S110: Generate trigger information according to a focus behavior of a user on at least one associated region in multiple associated regions on a deformation controllable device, where the multiple associated regions are multiple regions on which the user synchronously focuses or will synchronously focus.

S120: Control, in response to the trigger information, the deformation controllable device to be deformed to a target shape that meets at least one shape restriction condition, where the at least one shape restriction condition comprises: a distance between any two associated regions in the multiple associated regions is less than a distance threshold.

For example, a deformation control apparatus provided in the present application is used as an execution body of this embodiment to perform S110 to S120. Specifically, the deformation control apparatus may be disposed in a UE in a manner of software, hardware, or a combination of software and hardware, or the deformation control apparatus is the UE. The UE comprises but not limited to, smartphone, smart bracelet, smart television, tablet computer, notebook computer, and desktop computer.

According to at least one technical solution of the embodiments of the present application, a deformation controllable device is controlled to be deformed to a target shape that meets a requirement, making it more convenient for a user to focus on multiple associated regions on which a user synchronously focuses, and facilitating use of the deformation controllable device by the user.

Steps of the present application are further described by using the following implementing manners:

S110: Generate trigger information according to a focus behavior of a user on at least one associated region in multiple associated regions on a deformation controllable device.

In a possible implementing manner, the multiple associated regions may be multiple regions on which a user synchronously focuses, for example, multiple regions at which a user continuously and repeatedly switches to gaze (e.g. when a user views two displayed photos to determine whether two people in the two displayed photos are a same person, a gaze point is continuously switched between two regions corresponding to faces of the two people).

In a possible implementing manner, the multiple associated regions may be multiple regions on which a user will synchronously focus. For example, after a user performs an operation, appearance of multiple regions on which the user needs to synchronously focus will be activated (e.g. after a user clicks an input box, display of an input key region and an input visual feedback region on which the user needs to synchronously focus will be activated).

In an implementing manner of the present application, the multiple associated regions may be two associated regions. It should be known by a person skilled in the art that in another possible implementing manner, the multiple associated regions may be three or more associated regions.

In a possible implementing manner, optionally, association among multiple regions is preset and is stored in a storage medium. For example, it is set that in a scenario, two regions are two associated regions that are associated with each other.

In other possible implementing manner, optionally, before S110, the method may further comprise:
determining the multiple associated regions.

In a possible implementing manner, optionally, the determining the multiple associated regions may comprise:
determining, in response to focus behaviors of the user on multiple regions in a set time interval, the multiple regions as the multiple associated regions.

Here, the set time interval is generally a relatively short time interval, for example, 0.5 s.

Optionally, in a possible implementing manner, focus behaviors of a user on the multiple regions in the set time interval comprise: reciprocating focus behaviors performed on the multiple regions in the set time interval.

For example, by means of gaze tracking and the like, it is determined that a gaze point or an operation position of a user is switched between two regions for multiple times, and therefore, it is determined that the two regions are two associated regions.

In another possible implementing manner, optionally, multiple regions can be determined as the multiple associated regions according to historical focus behaviors of the user and/or other users on the multiple regions in a set time interval.

For example, by means of historical data, it is discovered that in a presented scenario, a gaze point(s) or an operation position(s) of one or more users were switched between two regions for multiple times, and therefore, it is determined that the two regions are two associated regions.

In still another possible implementing manner, optionally, multiple regions may be determined as the multiple associated regions according to an existing association relationship among the multiple regions.

For example, two regions are separately an input region and an input visual feedback region, and therefore, the two regions have an input feedback association relationship. With regard to two regions having such an association relationship, when attention of a user is on one of the regions, the attention is necessarily switched to the other region in a short time. Therefore, multiple regions can be determined as the multiple associated regions according to such an association relationship.

Certainly, multiple associated regions may be determined according to another possible association relationship. For example, a comparison association relationship between two display regions separately corresponding to two pictures for comparison in a game of "spot the difference", and a parallel option association relationship among multiple regions separately corresponding to multiple parallel options for a user to select (e.g. two display regions separately corresponding to an option of "confirm" and an option of "cancel" in a close confirm dialog box that pops up when a close button is clicked). There are many such scenarios, which are not enumerated herein.

In a possible implementing manner, the focus behavior comprises at least one of the following:
gaze, an input operation, and an activation operation.

Using the multiple associated regions being two associated regions as an example, s110 may be:
generating the trigger information according to gaze of a user at one associated region in the two associated regions; or generating the trigger information according to an input operation of a user on one associated region in the two associated region s (e.g. an operation such as a click of a mouse in the associated region, touch of a hand in the associated region); or generating the trigger information according to an activation operation of a user on the two associated regions (e.g. the operation of a click in an input box described as above).

S120: Control, in response to the trigger information, the deformation controllable device to be deformed to a target shape that meets at least one shape restriction condition.

In a possible implementing manner, s120 comprises:

determining, in response to the trigger information at least according to a current shape of the deformation controllable device and multiple positions of the multiple associated regions on the deformation controllable device, whether the current shape meets the at least one shape restriction condition; and controlling, in response to that the current shape fails to meet the at least one shape restriction condition, the deformation controllable device to be deformed to the target shape.

When the current shape meets the at least one shape restriction condition, no deformation control operation may be performed.

In a possible implementing manner, an execution body of this method is the deformation controllable device, and the controlling the deformation controllable device to be deformed may comprise: adjusting a shape of the deformation controllable device.

In another possible implementing manner, an execution body of this method is not the deformation controllable device and is another UE, and therefore, the controlling the deformation controllable device to be deformed may comprise:

sending a deformation control instruction to the deformation controllable device.

In a possible implementing manner, optionally, the controlling the deformation controllable device to be deformed to the target shape may comprise:

determining the target shape at least according to a current shape of the deformation controllable device, multiple positions of the multiple associated regions on the deformation controllable device, and the at least one shape restriction condition; and controlling, according to the target shape, the deformation controllable device to be deformed.

In this implementing manner, the target shape is directly acquired, so as to control the deformation controllable device to be deformed, by one step, to the target shape.

In another possible implementing manner, the target shape may not be directly calculated, and multiple deformation attempts are performed to continuously get close to the target shape. Therefore, optionally, the controlling the deformation controllable device to be deformed to the target shape comprises:

controlling the deformation controllable device to undergo deformation;

determining whether a shape of the deformation controllable device after the deformation meets the at least one shape restriction condition; and continuing, in response to that the shape of the deformation controllable device after the deformation fails to meet the at least one shape restriction condition, controlling the deformation controllable device to undergo deformation until a shape of the deformation controllable device after the deformation meets the at least one shape restriction condition.

In this way, a final shape that meets the at least one shape restriction condition is the target shape.

In this implementing manner, when the deformation controllable device is controlled to be deformed, and the shape after the deformation fails to meet the at least one shape restriction condition, a parameter for the next deformation may be determined according to whether the shape after the deformation is close to meeting the at least one shape restriction condition, for example, if the shape is close to meeting the at least one shape restriction condition, deformation may be continued according to an original deformation direction; and if the shape is far away from meeting the at least one shape restriction condition, deformation may be continued along a reverse direction of the direction of the earlier deformation.

In this implementing manner, the at least one shape restriction condition comprises:

a first shape restriction condition:

a distance between any two associated regions in the multiple associated regions is less than a distance threshold.

In this embodiment of the present application, the distance threshold can be obtained in advance according to calculation or training and learning. For example, the distance threshold is determined by using a basis that a user can conveniently switch between the multiple associated regions (e.g. a user can switch between the multiple associated regions by turning eyes with an amplitude in a relatively small range without turning a head, or a region that can be covered by one hand or fingers of both hands of a user).

Figure 2A:
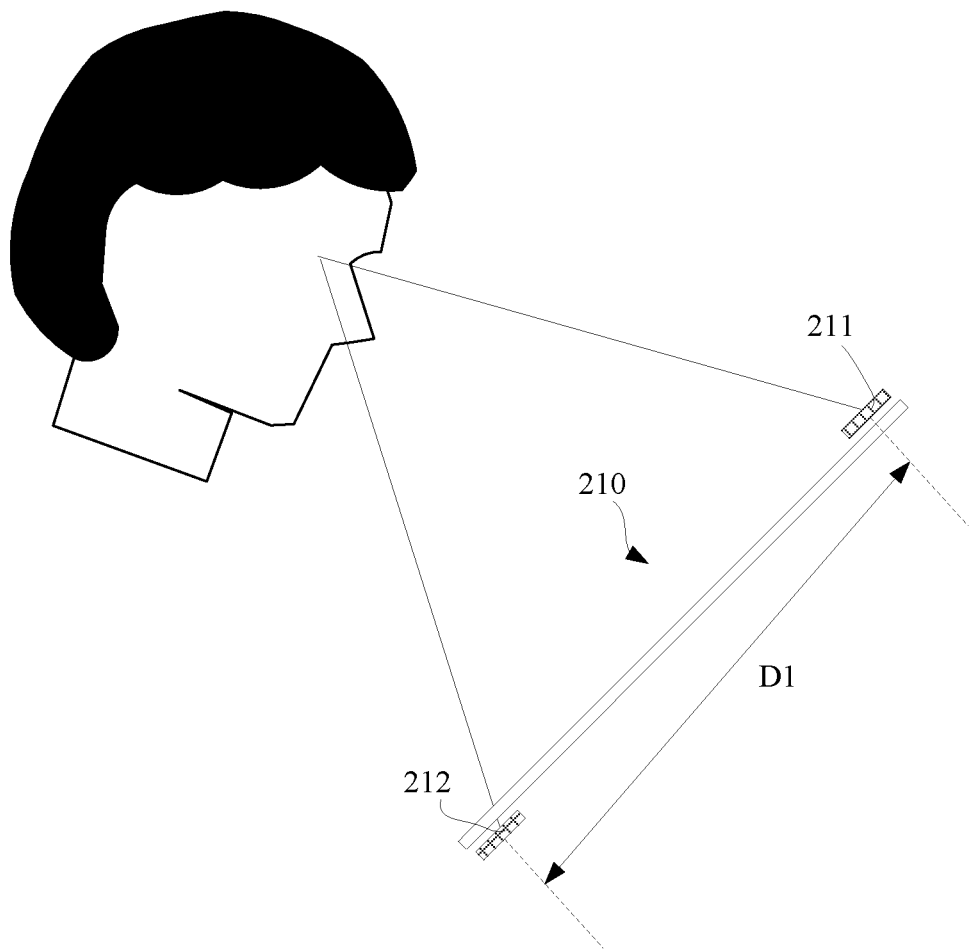
FIGS. 2a to 2c are schematic diagrams of application scenarios of the deformation control method according to embodiments of the present application.

As shown in FIG. 2a, description is made by using a situation that the multiple associated regions on a deformation controllable device 210 in a scenario comprise two associated regions, a first associated region 211 and a second associated region 212.

As shown in FIG. 2a, the first associated region 211 and the second associated region 212 are separately located at two ends of a longitudinal direction of the deformation controllable device 210.

In a state shown in FIG. 2a, for example, a user needs to turn a head or turn eyes in a relatively large amplitude, so as to enable a line-of-sight to switch between content of the first associated region 211 (which may be displayed content, or physically existing content, such as a physical button) and content of the second associated region 212, or a user is unable to synchronously hold the deformation controllable device 210 by one hand and switch, by using fingers, between the two associated regions.

In this implementing manner, whether a current shape of the deformation controllable device 210 meets the first shape restriction condition may be determined first. Here, in the first shape restriction condition, the distance threshold is set to d. A distance between the first associated region 211 and the second associated region 212 is D1, and D1>d. Therefore, the current shape of the deformation controllable device 210 fails to meet the first shape restriction condition.

Figure 2B:
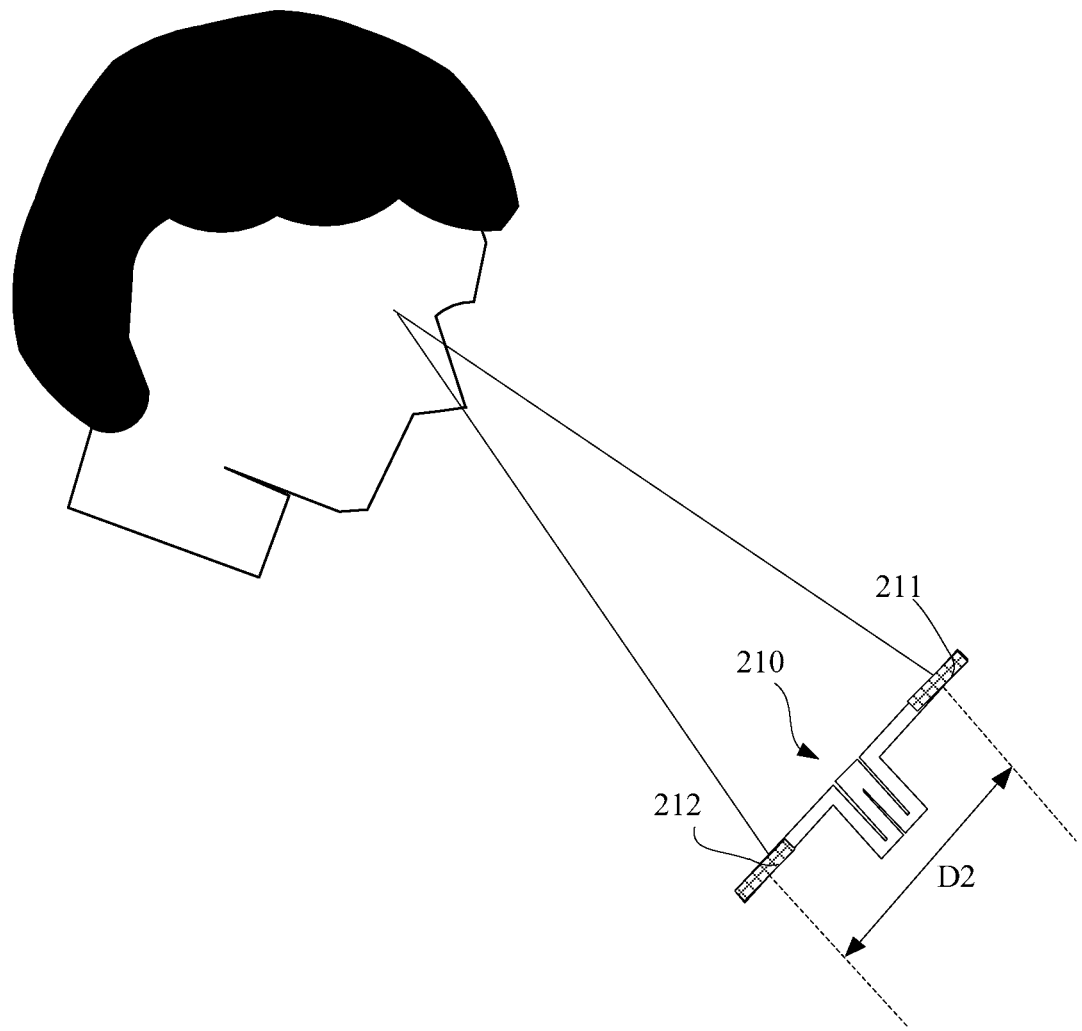

In this implementing manner, it can be determined according to s120 that a target shape of the deformation controllable device 210 is as shown in FIG. 2b, in which the distance between the first associated region 211 and the second associated region 212 is changed into D2, and D2<d. In a scenario shown in FIG. 2b, a user can clearly view, only by turning eyes in a small amplitude, content separately presented on the first associated region 211 and the second associated region 212.

Figure 2C:
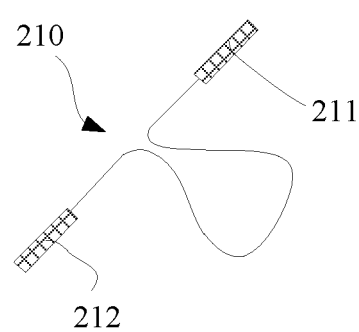

It should be known by a person skilled in the art that in a case of knowing a current shape of the deformation controllable device 210 and positions of the multiple associated regions on the deformation controllable device 210, multiple target shapes that meet the first shape restriction condition may be determined. For example, a target shape of the deformation controllable device 210 shown in FIG. 2*a* may be another shape shown in FIG. 2*c*. Therefore, in an implementing manner, when the target shape is determined, another possible restriction condition may be comprised, for example, a shape of the deformation controllable device 210 may be only switched between multiple limited shapes, and a shape of a region on the deformation controllable device 210 is restricted to be unchanged, and the like.

In a possible implementing manner, the method further comprises: determining an associated region in the multiple associated regions on which the user currently focuses; and the at least one shape restriction condition further comprises:

a second shape restriction condition: retaining a shape of the associated region on which the user currently focuses.

In this implementing manner, to avoid bringing inconvenience to current use of a user (for example, deformation of a gaze position causes discomfort such as dizziness), the second shape restriction condition may be used to ensure that a shape of the associated region on which the user is focusing keeps unchanged, and a shape of another region is changed by using the associated region as a reference, so as to achieve the target shape.

In a possible implementing manner, the controlling the deformation controllable device to be deformed to the target shape may be achieved by using an adjustment performed by a deformation mechanism (e.g. a pneumatic structure that is expanded outwards when a pressure is increased, and is contracted inwards when the pressure is decreased) in the deformation controllable device.

In another possible implementing manner, deformation of the deformation controllable device is implemented by adjusting at least one deformation control parameter of a deformation controllable material.

In this implementing manner, when the at least one deformation control parameter changes, a shape of the deformation controllable material also changes, and therefore, a shape adjustment of the deformation controllable device in the method of this embodiment of the present application can be achieved.

In a possible implementing manner, the deformation controllable material comprises: a photo-deformable material.

The photo-deformable material undergoes deformation, e.g. deformation such as stretching and contracting, and bending, corresponding to light in response to at least one light feature of the light applied to the photo-deformable material. For example, the photo-deformable material may comprise: photostrictive ferroelectric ceramics, a photo-deformable polymer, and the like.

In a possible implementing manner, the at least one light feature may comprise a wavelength of the light. For example, when light of a first wavelength is irradiated on the photo-deformable material, the photo-deformable material undergoes a first change, and when light of a second wavelength is irradiated on the photo-deformable material, the photo-deformable material undergoes a second change.

In a possible implementing manner, the at least one light feature may further comprise: an irradiation time, an incident angle, light intensity, or light distribution of the light when the light is irradiated on the photo-deformable material (e.g. different wavelengths of light irradiated on different areas of the photo-deformable material, and/or different irradiation times, and/or different incident angles, and/or different light intensity), or the at least one light feature may be a combination of the above light features.

In another possible implementing manner, the deformation controllable material comprises: an electro-deformable material. In a possible implementing manner, the electro-deformable material may be, for example, a piezoelectric material or an electro-deformable liquid crystal elastic material.

The electro-deformable material undergoes deformation, e.g. deformation such as stretching and contracting, corresponding to an electric field in response to at least one electric field feature of the electric field applied to the electro-deformable material.

The at least one electric field feature comprises:

a direction of the electric field, electric intensity of the electric field, distribution of the electric field, or an application time of the electric field on the electro-deformable material; or a combination of the foregoing electric field features.

In still another possible implementing manner, the deformation controllable material comprises: a thermally-deformable material. In a possible implementing manner, the thermally-deformable material may be, for example, a thermally-deformable liquid crystal elastomer.

The thermally-deformable material undergoes deformation, e.g. deformation such as stretching and contracting, corresponding to a temperature field in response to at least one temperature field feature of the temperature field applied to the thermally-deformable material.

In a possible implementing manner, the at least one temperature field feature comprises:

temperature distribution of the temperature field, a specific temperature, or duration of the temperature field; or a combination of the above temperature field features.

When different regions of the deformation controllable device need to be subjected to different deformation, in a possible implementing manner, different deformation of the different regions may be implemented by separately controlling deformation control parameters of the different regions of an integral deformation controllable material; and in another possible implementing manner, a deformation controllable material array comprising multiple deformation controllable material units may be used, and deformation control parameters of the deformation controllable material units are separately controlled.

It should be understood by a person skilled in the art that in the foregoing methods of the specific implementing manners of the present application, the value of the serial number of each step described above does not mean an execution sequence, and the execution sequence of each step should be determined according to the function and internal logic thereof, and should not be any limitation on the implementation procedure of the embodiments of the present application.

Figure 3:
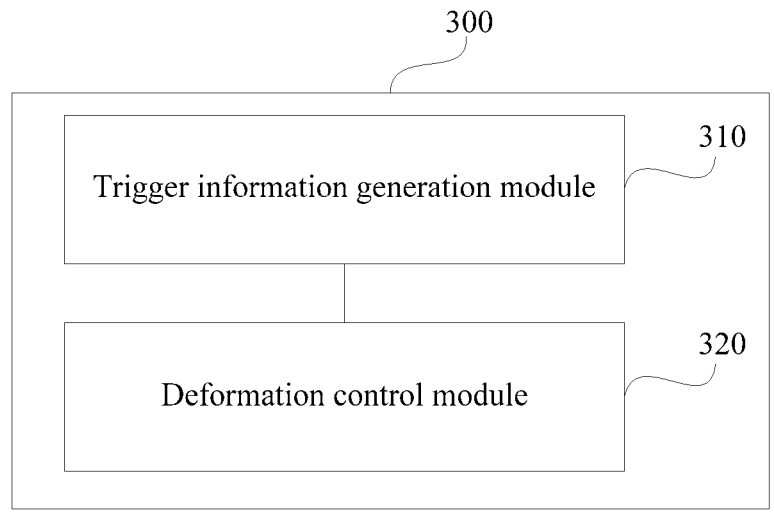
FIG. 3 is a schematic block diagram of a structure of a deformation control apparatus according to an embodiment of the present application.

As shown in FIG. 3, an embodiment of the present application provides a deformation control apparatus 300, comprising:

a trigger information generation module 310, configured to generate trigger information according to a focus behavior of a user on at least one associated region in multiple associated regions on a deformation controllable device, where the multiple associated regions are multiple regions on which the user synchronously focuses or will synchronously focus; and a deformation control module 320, configured to control, in response to the trigger information, the deformation controllable device to be deformed to a target shape that meets at least one shape restriction condition, where the at least one shape restriction condition comprises: a distance between any two associated regions in the multiple associated regions is less than a distance threshold.

According to at least one technical solution of the embodiments of the present application, a deformation controllable device is controlled to be deformed to a target shape that meets a requirement, making it more convenient for a user to focus on multiple associated regions on which a user synchronously focuses, and facilitating use of the deformation controllable device by the user.

In a possible implementing manner, optionally, association among multiple regions is preset and is stored in a storage medium.

Figure 4A:
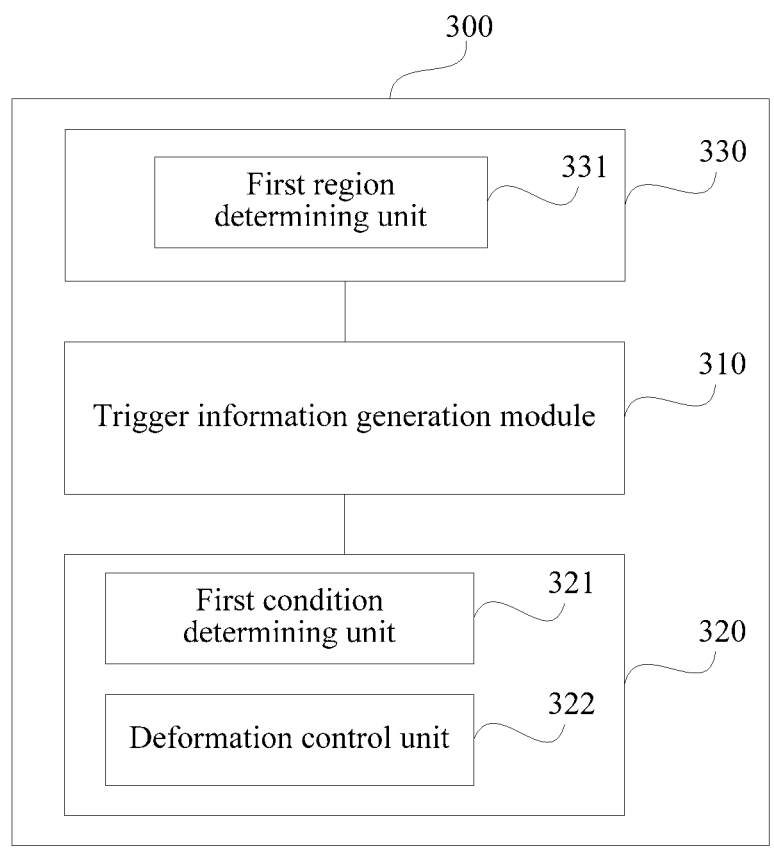
FIGS. 4a to 4d are schematic block diagrams of structures of four deformation control apparatuses according to embodiments of the present application.

In another possible implementing manner, as shown in FIG. 4*a*, optionally, the apparatus 300 may further comprise:

an associated region determining module 330, configured to determine the multiple associated regions.

In a possible implementing manner, optionally, the associated region determining module 330 may comprise:

a first region determining unit 331, configured to determine, in response to focus behaviors of the user on multiple regions in a set time interval, the multiple regions as the multiple associated regions.

Optionally, in a possible implementing manner, focus behaviors of a user on the multiple regions in the set time interval comprise: reciprocating focus behaviors performed on the multiple regions in the set time interval.

Figure 4B:
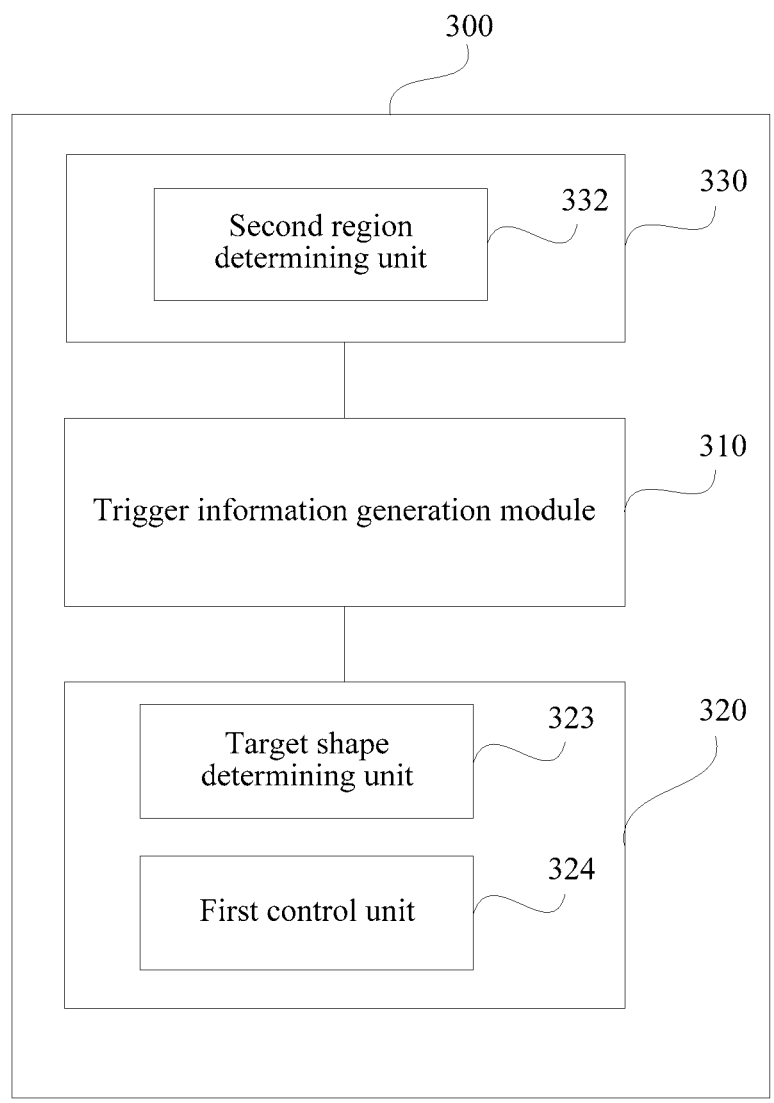

In another possible implementing manner, as shown in FIG. 4*b*, optionally, the associated region determining module 330 comprises:

a second region determining unit 332, configured to determine, in response to historical focus behaviors of at least one user on multiple regions in a set time interval, the multiple regions as the multiple associated regions.

Figure 4C:
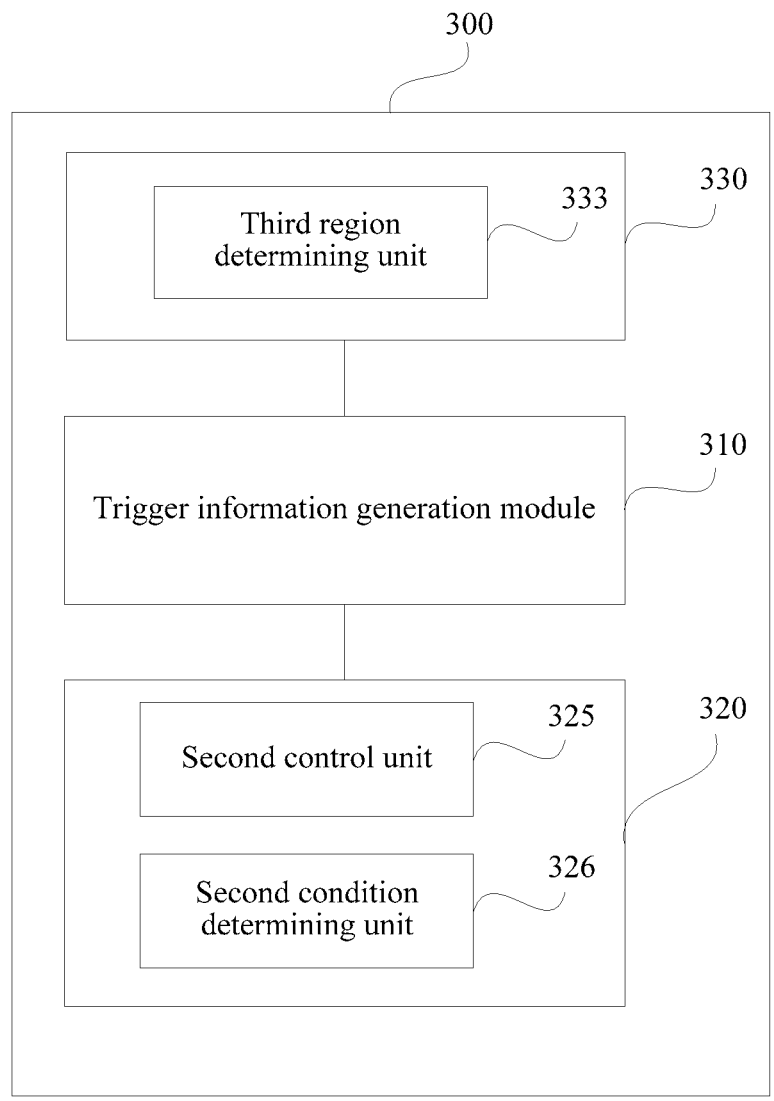

In still another possible implementing manner, as shown in FIG. 4*c*, optionally, the associated region determining module 330 comprises:

a third region determining unit 333, configured to determine, according to an existing association relationship among multiple regions, the multiple regions as the multiple associated regions.

In a possible implementing manner, optionally, the association relationship may comprise:

an input feedback association relationship between an input region and an input visual feedback region.

In a possible implementing manner, the focus behavior comprises at least one of the following:

gaze, an input operation, and an activation operation.

In a possible implementing manner, the apparatus 300 is a part of the deformation controllable device or is the deformation controllable device, and the deformation control module 320 may comprise a deformation execution unit, configured to adjust a shape of the deformation controllable device.

In another possible implementing manner, the apparatus 300 belongs to a device other than the deformation controllable device. At this time, the deformation control module 320 may comprise a communications unit, configured to send a deformation control instruction to the deformation controllable device.

In a possible implementing manner, as shown in FIG. 4*a*, the deformation control module 320 comprises:

a first condition determining unit 321, configured to determine, in response to the trigger information at least according to a current shape of the deformation controllable device and multiple positions of the multiple associated regions on the deformation controllable device, whether the current shape meets the at least one shape restriction condition; and a deformation control unit 322, configured to control, in response to that the current shape fails to meet the at least one shape restriction condition, the deformation controllable device to be deformed to the target shape.

In a possible implementing manner, as shown in FIG. 4*b*, optionally, the deformation control module 320 comprises:

a target shape determining unit 323, configured to determine the target shape at least according to a current shape of the deformation controllable device, multiple positions of the multiple associated regions on the deformation controllable device, and the at least one shape restriction condition; and a first control unit 324, configured to control, according to the target shape, the deformation controllable device to be deformed.

In this implementing manner, the target shape is directly acquired, so as to control the deformation controllable device to be deformed, by one step, to the target shape.

In another possible implementing manner, the target shape may not be directly calculated, and multiple deformation attempts are performed to continuously get close to the target shape. Therefore, as shown in FIG. 4*c*, optionally, the deformation control module 320 comprises:

a second control unit 325, configured to control the deformation controllable device to undergo deformation; and a second condition determining unit 326, configured to send, in response to that a shape of the deformation controllable device after the deformation fails to meet the at least one shape restriction condition, an instruction to the second control unit, so as to continue controlling the deformation controllable device to be deformed until a shape of the deformation controllable device after the deformation meets the at least one shape restriction condition.

Figure 4D:
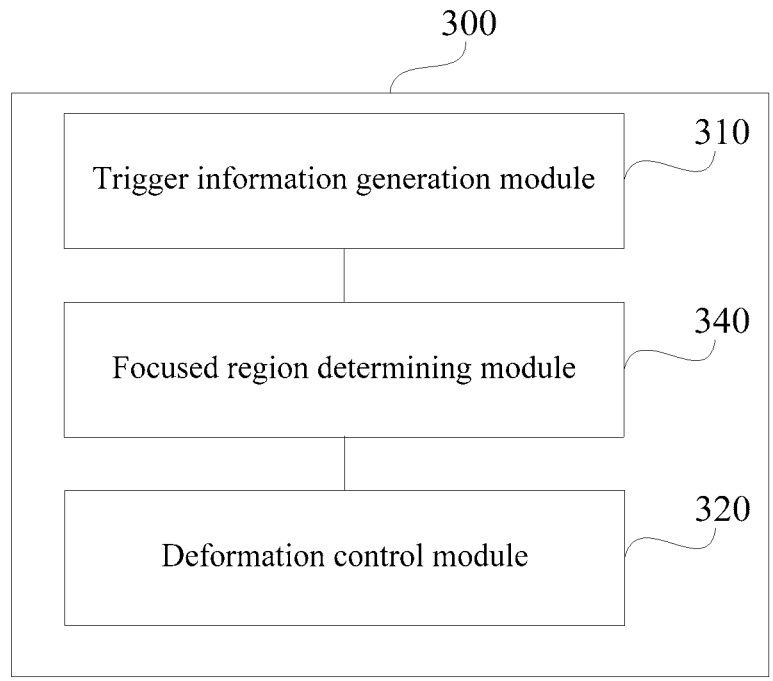

In a possible implementing manner, as shown in FIG. 4*d*, the apparatus 300 further comprises:

a focused region determining module 340, configured to determine an associated region in the multiple associated regions on which the user currently focuses; and the at least one shape restriction condition further comprises:

retaining a shape of the associated region on which the user currently focuses.

In this implementing manner, inconvenience to a user caused by deformation may be reduced.

For further implementation of functions of modules and units in this embodiment, reference may be made to corresponding implementing manners in the foregoing method embodiments.

Figure 5:
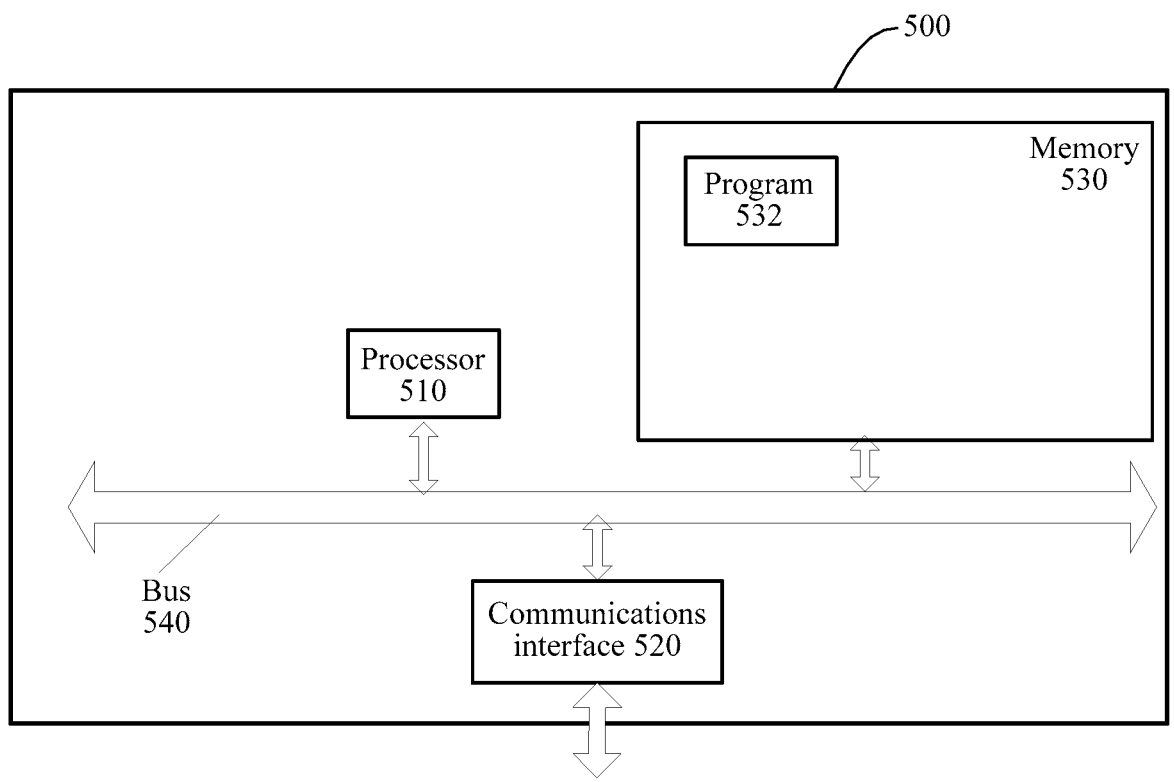
FIG. 5 is a schematic block diagram of a structure of a UE according to an embodiment of the present application.

FIG. 5 is a schematic structural diagram of another UE 500 according to an embodiment of the present application. Specific embodiments of the present application are not intended to limit the specific implementation of the UE 500. As shown in FIG. 5, the UE 500 may comprise:

a processor 510, a communications interface 520, a memory 530, and a communications bus 540.

The processor 510, the communications interface 520, and the memory 530 communicate with each other by using the communications bus 540.

The communications interface 520 is configured to communicate with a network element such as a client.

The processor 510 is configured to execute a program 532, and specifically can perform relevant steps in the foregoing method embodiments.

Specifically, the program 532 may comprise program code, where the program code comprises a computer operation instruction.

The processor 510 may be a central processing unit (CPU), or an application specific integrated circuit (ASIC), or may be configured as one or more integrated circuits that implement the embodiments of the present application.

The memory 530 is configured to store a program 532. The memory 530 may comprise a high speed random access memory (RAM), and may also comprise a non-volatile memory such as at least one magnetic disk storage. The program 532 may be specifically configured to enable the UE 500 to execute the following operations:

generating trigger information according to a focus behavior of a user on at least one associated region in multiple associated regions on a deformation controllable device, where the multiple associated regions are multiple regions on which the user synchronously focuses or will synchronously focus; and controlling, in response to the trigger information, the deformation controllable device to be deformed to a target shape that meets at least one shape restriction condition, where the at least one shape restriction condition comprises: a distance between any two associated regions in the multiple associated regions is less than a distance threshold.

In a possible implementing manner, the UE is the deformation controllable device.

For specific implementation of the steps in the program 532, reference may be made to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The computer software product is stored in a storage medium and comprises several instructions for instructing a computer device (which may be a personal computer, a server, or a network device) to perform all or a part of the steps of the methods in the embodiments of the present application. The foregoing storage medium comprises: any medium that can store program code, such as a USB flash drive, a removable hard disk, a read-only memory (ROM), a random access memory (RAM), a magnetic disk, or an optical disc.

The foregoing implementing manners are only used to describe the present application, but not to limit the present application. A person of ordinary skill in the art can still make various alterations and modifications without departing from the spirit and scope of the present invention; therefore, all equivalent technical solutions also fall within the scope of the present invention, and the patent protection scope of the present invention should be subject to the claims.

What is claimed is:

1. A deformation control method applicable to a deformation controllable device comprising a plurality of regions for presentation, comprising:

determining, by gaze tracking, that a gaze of a user is continuously switching between multiple associated regions that are separated by intermediate regions on the deformation controllable device;

determining whether an amplitude in which the user turns eyes to switch the gaze between the multiple associated regions is greater than a threshold; and in response to determining that the amplitude is greater than the threshold, reducing the amplitude by controlling the deformation controllable device to be deformed to a target shape that meets at least one shape restriction condition comprising deforming some of the intermediate regions to be folded and blocked from presentation to the user, wherein a distance between the multiple associated regions is reduced, and using the multiple associated regions with the reduced distance therebetween for presentation.

2. The method of claim 1, further comprising:

determining the multiple associated regions.

3. The method of claim 2, wherein the determining the multiple associated regions comprises:

determining, in response to focus behaviors of the user on multiple regions in a set time interval, the multiple regions as the multiple associated regions.

4. The method of claim 3, wherein the focus behaviors comprise at least one of the following:

a gaze, an input operation, and an activation operation.

5. The method of claim 2, wherein the determining the multiple associated regions comprises:

determining, in response to historical focus behaviors of at least one user on multiple regions in a set time interval, the multiple regions as the multiple associated regions.

6. The method of claim 2, wherein the determining the multiple associated regions comprises:

determining, according to an existing association relationship among multiple regions, the multiple regions as the multiple associated regions.

7. The method of claim 6, wherein the association relationship comprises:

an input feedback association relationship between an input region and an input visual feedback region.

8. The method of claim 1, wherein the controlling the deformation controllable device to be deformed to a target shape comprises:

determining, at least according to a current shape of the deformation controllable device and multiple positions of the multiple associated regions on the deformation controllable device, whether the current shape meets the at least one shape restriction condition; and controlling, in response to that the current shape fails to meet the at least one shape restriction condition, the deformation controllable device to be deformed to the target shape.

9. The method of claim 1, wherein the controlling the deformation controllable device to be deformed to a target shape comprises:

determining the target shape at least according to a current shape of the deformation controllable device, multiple positions of the multiple associated regions on the deformation controllable device, and the at least one shape restriction condition; and controlling, according to the target shape, the deformation controllable device to be deformed.

10. The method of claim 1, wherein the controlling the deformation controllable device to be deformed to a target shape comprises:

controlling the deformation controllable device to undergo a first deformation; and continuing, in response to that a shape of the deformation controllable device after the first deformation fails to meet the at least one shape restriction condition, controlling the deformation controllable device to undergo a second deformation until a shape of the deformation controllable device after the second deformation meets the at least one shape restriction condition.

11. The method of claim 1, wherein the method further comprises: determining an associated region in the multiple associated regions on which the user currently focuses; and the at least one shape restriction condition further comprises: retaining a shape of the associated region on which the user currently focuses.

12. A deformation control apparatus applicable to a deformation controllable device comprising a plurality of regions for presentation, comprising:

a trigger information generation module, configured to determine, by gaze tracking, that a gaze of a user is continuously switching between multiple associated regions that are separated by intermediate regions on the deformation controllable device; and a deformation control module, configured to determine whether an amplitude in which the user turns eyes to switch the gaze between the multiple associated regions is greater than a threshold, and in response to determining that the amplitude is greater than the threshold, reduce the amplitude by controlling the deformation controllable device to be deformed to a target shape that meets at least one shape restriction condition comprising deforming some of the intermediate regions to be folded and blocked from presentation to the user, wherein a distance between the multiple associated regions is reduced, and using the multiple associated regions with the reduced distance therebetween for presentation.

13. The apparatus of claim 12, wherein the apparatus further comprises:

an associated region determining module, configured to determine the multiple associated regions.

14. The apparatus of claim 13, wherein the associated region determining module comprises:

a first region determining unit, configured to determine, in response to focus behaviors of the user on multiple regions in a set time interval, the multiple regions as the multiple associated regions.

15. The apparatus of claim 14, wherein the focus behaviors comprise at least one of the following:

a gaze, an input operation, and an activation operation.

16. The apparatus of claim 13, wherein the associated region determining module comprises:

a second region determining unit, configured to determine, in response to historical focus behaviors of at least one user on multiple regions in a set time interval, the multiple regions as the multiple associated regions.

17. The apparatus of claim 13, wherein the associated region determining module comprises:

a third region determining unit, configured to determine, according to an existing association relationship among multiple regions, the multiple regions as the multiple associated regions.

18. The apparatus of claim 17, wherein the association relationship comprises:

an input feedback association relationship between an input region and an input visual feedback region.

19. The apparatus of claim 12, wherein the deformation control module comprises:

a first condition determining unit, configured to determine at least according to a current shape of the deformation controllable device and multiple positions of the multiple associated regions on the deformation controllable device, whether the current shape meets the at least one shape restriction condition; and a deformation control unit, configured to control, in response to that the current shape fails to meet the at least one shape restriction condition, the deformation controllable device to be deformed to the target shape.

20. The apparatus of claim 12, wherein the deformation control module comprises:

a target shape determining unit, configured to determine the target shape at least according to a current shape of the deformation controllable device, multiple positions of the multiple associated regions on the deformation controllable device, and the at least one shape restriction condition; and a first control unit, configured to control, according to the target shape, the deformation controllable device to be deformed.

21. The apparatus of claim 12, wherein the deformation control module comprises:

a second control unit, configured to control the deformation controllable device to undergo a first deformation; and a second condition determining unit, configured to send, in response to that a shape of the deformation controllable device after the first deformation fails to meet the at least one shape restriction condition, an instruction to the second control unit, so as to continue controlling the deformation controllable device to undergo a second deformation until a shape of the deformation controllable device after the second deformation meets the at least one shape restriction condition.

22. The apparatus of claim 12, wherein the apparatus further comprises:

a focused region determining module, configured to determine an associated region in the multiple associated regions on which the user currently focuses; and the at least one shape restriction condition further comprises:

retaining a shape of the associated region on which the user currently focuses.

23. User equipment (UE), wherein the UE comprises:

a memory, configured to store a program; and a processor, configured to execute the program stored in the memory, wherein the program enables the processor to execute the following operations:

determining, by gaze tracking, a gaze of a user is continuously switching between multiple associated regions that are separated by intermediate regions on the deformation controllable device;

determining whether an amplitude in which the user turns eyes to switch the gaze between the multiple associated regions is greater than a threshold;

in response to determining that the amplitude is greater than the threshold, reducing the amplitude by controlling the deformation controllable device to be deformed to a target shape that meets at least one shape restriction condition comprising deforming some of the intermediate regions to be folded and blocked from presentation to the user, wherein a distance between the multiple associated regions is reduced, and using the multiple associated regions with the reduced distance therebetween for presentation.

* * * * *